April 12, 1932. O. G. SIMMONS 1,853,643
METHOD OF AND APPARATUS FOR GENERATING THE CONVOLUTE
TEETH OR THREADS OF WORMS AND THE LIKE
Filed Nov. 15, 1929 4 Sheets-Sheet 1

April 12, 1932. O. G. SIMMONS 1,853,643
METHOD OF AND APPARATUS FOR GENERATING THE CONVOLUTE
TEETH OR THREADS OF WORMS AND THE LIKE
Filed Nov. 15, 1929 4 Sheets-Sheet 2

INVENTOR

Patented Apr. 12, 1932

1,853,643

UNITED STATES PATENT OFFICE

OLIVER G. SIMMONS, OF LAKEWOOD, OHIO

METHOD OF AND APPARATUS FOR GENERATING THE CONVOLUTE TEETH OR THREADS OF WORMS AND THE LIKE

Application filed November 15, 1929. Serial No. 407,418.

This invention relates to a novel method of and apparatus for generating, on the moulding principle of action, the convolute teeth or threads of worms and other analogous articles of manufactue comprising lines of convolution employed in the arts.

Within the scope of the term analogous articles of manufacture it is understood that there is included such articles as have threads or teeth capable of being generated on lines of convolution to produce helicoidal surfaces by the method, means and mechanism of the nature herein disclosed.

A general object of my invention is to produce economically articles of manufacture, of the character referred to, by reciprocating a cutting tool across the face of a blank along a line angularly disposed to the axis of the blank through evolution by imparting motions to a cutting tool and a blank and correlating said motions as will hereinafter appear.

The detailed objects of my invention are to generate conjugate threads or teeth comprising lines of convolution upon the articles of manufacture above referred to by imparting rotary motions to a cutter wheel or tool and the blank to be operated upon; imparting a linear motion to either the cutter or the blank so rotated or to both, differentially correlating the motions aforesaid and imparting a linear reciprocating motion independently of said differentially correlated motions to either the cutter wheel or tool or to the blank, preferably to the cutter wheel along its axis, the said axis being adjustably positioned to any given angle with respect to the axis of the blank.

In my Letters Patent No. 1,426,680, dated August 22, 1922, and Letters Patent No. 1,551,705, dated September 1, 1925, it was shown that to generate convolute lines in worms and the like, or helical threads, single or multiple, the work or blank is rotated at suitable speed with respect to a cutter of one or more cutting elements or teeth, or having a circumferential series of cutting teeth, which cutter rotates upon an axis substantially at right angles to, or normal to the helix of the thread, cutter, work or blank. The cutter and work or blank are moved with respect to each other longitudinally of or parallel to the axis of rotation of the work or blank, preferably by moving the cutter longitudinally of the blank. In accordance with my present invention, preferably the cutter wheel is reciprocated across the face of the blank longitudinally of the cutter wheel axis, which axis is disposed angularly with respect to the axis of the work to bring the cutter teeth normal to the helix of the thread or teeth cut upon the work or blank.

My copending applications, Serial No. 178,021, method of cutting gear teeth, filed March 24, 1927, and Serial No. 234,788, method of generating gears, filed November 21, 1927, disclose methods of generating the teeth of spur and helical gears by the use of a straight tooth (spur gear) gear shaper cutter as a cutting element and by the use of a helical (twisted tooth) gear shaper cutter as a cutting element respectively.

In accordance with my present invention the cutter is preferably provided with straight teeth, and, for convenience of expression, the cutter wheel may be referred to as a gear-shaped cutter or cutting element.

The invention consists in a new method and means for accomplishing the foregoing objects, not only in the particular form herein illustrated but in all equivalent constructions and arrangements.

The drawings accompanying this specification, it is understood, are for purposes of illustration only. The means herein shown are but a part of the many possible mechanisms for obtaining the desired motion between the cutter and the blank being operated upon in the practice of this method, and are therefore used for purposes of illustration only.

With the above and other objects in view, invention may be said to comprise the method of and apparatus for generating the convolute teeth or threads of worms and the like, as illustrated in the accompanying drawings, hereinafter described and particularly set forth in the appended claims, together with such variation and modification thereof as will be apparent to one skilled in the art to which the invention appertains.

Referring now to the accompanying drawings.

Figure 1:
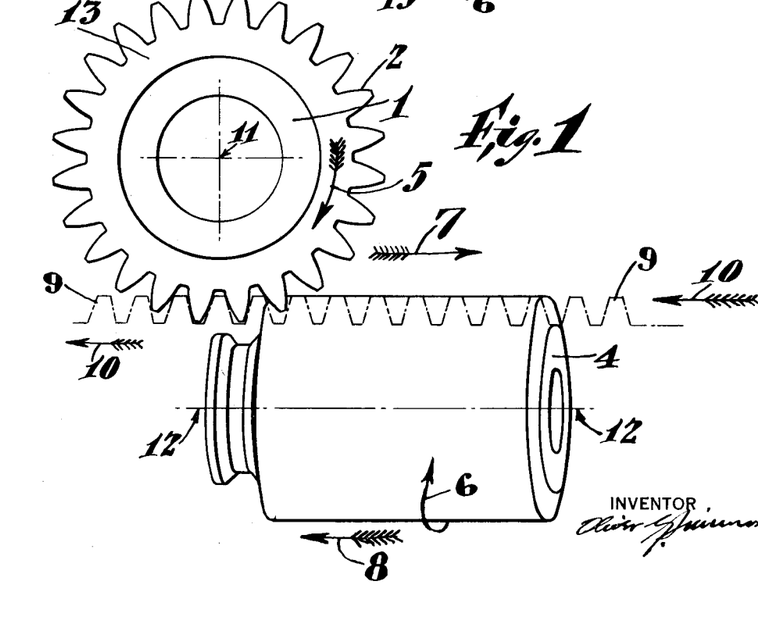
Fig. 1 is a vertical elevation of the cutter wheel and blank illustrating the relation of each to an intermeshing continuously moving imaginary rack. This view further illustrates the beginning of the generating cutting action in cutting the threads in a blank.
Figure 2:
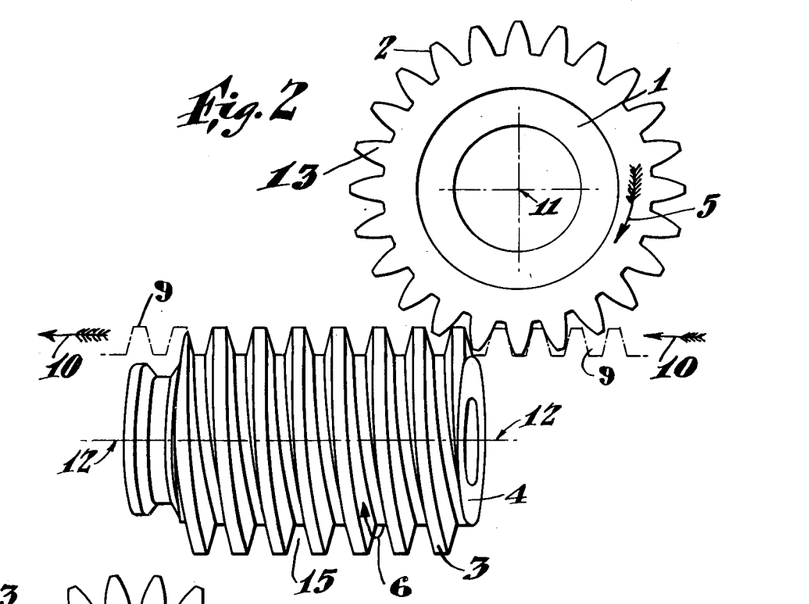
Fig. 2 is similar to Fig. 1, except in this view the cutter has completely generated the threads in the blank and is therefore illustrated as being at the opposite end of the work.

Referring to Fig. 1, the numeral 1 indicates a tool or cutter wheel provided with edged cutting teeth 2 radially projecting from the periphery of the cutter, which are adapted to generate cut the thread 3 of the worm 4, see Fig. 2, when said cutter and blank are given correlated rotary motions, the cutter in the direction of the arrow 5 and the work in the direction of the arrow 6, equivalent to the intermeshing rotary motions of a worm and its intermeshing wheel, and in addition to the rotary motions of the tool and blank referred to, the cutter or the blank, preferably the cutter, is given a linear movement in substantially the direction indicated by the arrow 7, it being understood that if this linear movement is given to the blank it will be in substantially the direction indicated by the arrow 8. This linear movement takes place simultaneously with the rotary movements of the cutter and blank previously referred to, and with the same intermeshing relationship as would be obtained if the rotating blank 4 contained the finished thread 3 and were in intermeshing relationship with the imaginary rack teeth 9, which rack is continuously moving in substantially the direction indicated by the arrow 10, said continuously moving rack teeth 9 also intermeshing with the teeth 2 of the cutter wheel 1.

In addition to the movements referred to, the cutter wheel 1, or the work 4, preferably the cutter 1, is reciprocated longitudinally of its axis 11, which axis in Figs. 1 and 2, as illustrated, will be perpendicular to the sheet of drawing, so that the cutter wheel 1 will move toward and away from the observer during this reciprocating movement. This takes place simultaneously with but independent of the movements previously referred to and when continued to the position of the cutter 1, shown in Fig. 2, the cutter will have completely generate cut the threads 3 of the worm 4.

Figure 3:
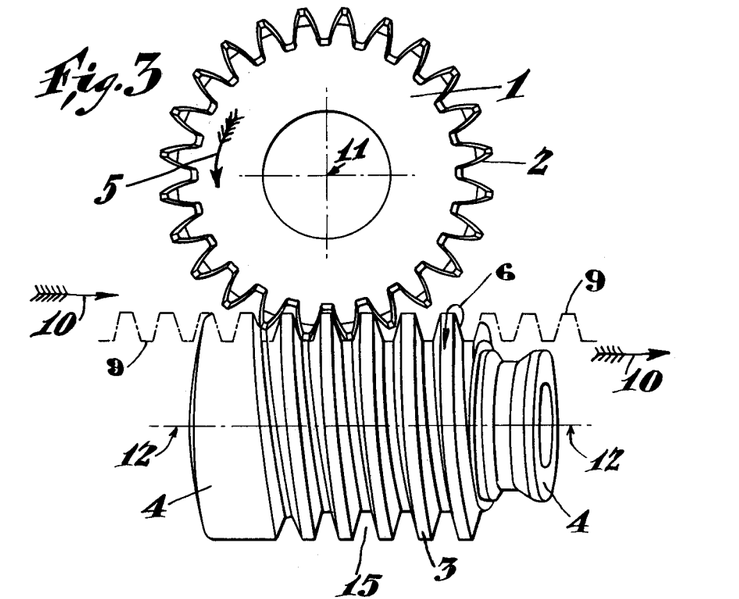
Fig. 3 is similar to Fig. 1, except that it is viewed from the opposite side and the cutter wheel has almost completed the generation of the thread in the blank.

In Figs. 1, 2 and 3 the axis 11 of the cutter is perpendicular to the sheet of drawing. In these three figures therefore the axis 12 of the worm wheel blank is illustrated as being at an angle to the sheet of drawing to bring the thread helix of the worm substantially at right angles or substantially normal to the cutting face 13 of the cutter. Either the axis 11 of the cutter or the axis 12 of the blank may be adjusted to this helix angle. In Figs. 1, 2 and 3 the axis 12 of the blank has been adjusted as illustrated, but the axis 11 of the cutter may be as readily adjusted, as will be later referred to in more detail.

The linear movement of the cutter in the direction of the arrow 7, or a linear movement of the work in the direction of the arrow 8, whichever is preferred, as hereinbefore referred to, will be substantially along a line parallel to and in the same plane as the axis 12 of the blank 4.

Figure 4:
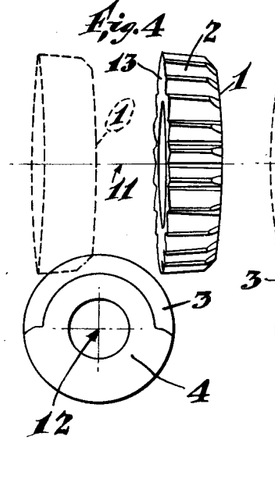
Fig. 4 is an end view to a reduced scale of Fig. 2. The view is taken in a plane normal to the axis of the work, as it would appear when viewed from the left hand side of the sheet of drawing, Fig. 2. Reciprocating movement of the cutter is shown in this view, the cutter being in full lines at one end of its stroke and in dotted lines at the other end of its stroke after it has passed across the face of the blank in the process of generating a single thread in the blank.

In Fig. 4 the axis 12 of the worm is perpendicular to the sheet of drawing and the axis 11 of the cutter is at an angle thereto corresponding to the helix angle of the single thread of the work 4. The end of the stroke of the reciprocating cutter 1 are shown in this view in full lines at one end and in dotted lines at the other. This reciprocation of the cutter on its axis 11 is independent of the other movements and can be relatively rapid as compared to the rotary movement of the cutter and work and the rectilinear movement heretofore referred to.

Figure 5:
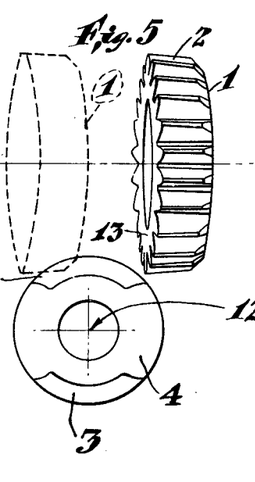
Fig. 5 is similar to Fig. 4, except in this view the work is provided with a double thread.
Figure 6:
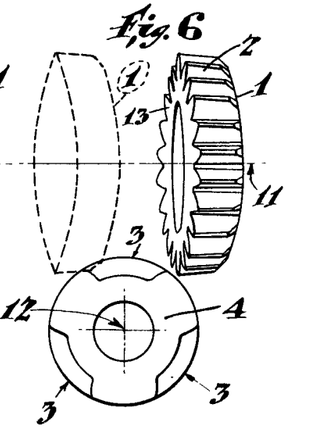
Fig. 6 is also similar to Fig. 4, except in this view the work is provided with a triple thread.

The method may be used to produce worms of single or multiple threads, as illustrated in Figs. 5 and 6. In Fig. 5 the cutter wheel 1 is shown as having generate cut the worm 4 having two threads 3. Simultaneously, the cutter 1 in Fig. 6 is shown as having generate cut three threads 3 in the worm 4. In a similar manner, the method could be illustrated to generate any given number of threads 3 in the worm blank 4.

The same pitch cutter may be used for generating cut single or multi thread worms as long as the pitch of the cutter corresponds to the normal pitch of the work as will be understood by those skilled in this art, it being but necessary to angularly adjust the axis of the cutter to the helix angle of the thread as described. This adjustment is illustrated in Figs. 4, 5 and 6, in which it is shown that the angular adjustment of the cutter in Fig. 5 is greater than that of Fig. 4 and that the angular adjustment of the cutter in Fig. 6 is greater than that of Fig. 5.

In cutting a double thread instead of a single thread, the cutter 1 will rotate faster in the direction of the arrow 5 than it would when cutting a single thread. This also holds true with respect to a greater number of threads and the truth of this will become clear when it is understood that regardless of the number of threads in the blank 4, see Fig. 1, they are, nevertheless, in intermeshing relationship with the imaginary rack 9, which rack is also in intermeshing relationship with the teeth 2 of the cutter wheel 1, as the blank 4 rotates continuously in the direction of the arrow 6. To make this more clear it is only necessary to imagine that the blank 4 of Fig. 1 is provided with a number of threads selected and follow the resultant movements as heretofore described. The direction of movements illustrated in Fig. 1 results from the fact that the worm is to be provided with a right hand thread as shown in Fig. 2. If a left hand thread is desired it will be necessary to dispose the cutter axis 11 or the work axis 12, as heretofore described, to the helix angle for the left hand worm selected. If this helix angle is the same as that for the right hand worm, and it will be if the diameter and lead of advance for one turn are the same, it becomes a simple matter to set the worm axis or the cutter axis to the same angular adjustment to the opposite side of zero. For example, it may be 5° right or left of a plane perpendicular to the axis of the blank. A right hand worm is shown as having been generated in Figs. 2, 3, 4, 5 and 6. If, therefore, the same worm were to be generated, except that it was to be left hand, the position of the work or of the cutter, as shown in the respective figures referred to, would tilt the opposite way the same amount that they now tilt as illustrated. See also Figs 7 and 8.

Referring to Fig. 1, let it be assumed that the thread to be generated in the worm 4 is to be left hand instead of right hand and that the worm blank is tilted the other way the required amount, and that the rotation of the blank is in the direction indicated by the arrow 6. The rack 9, as a result, will move in the opposite direction to that indicated by the arrow 10 and assuming that intermeshing relationship is maintained between the imaginary rack and the cutter and worm being generated the cutter 1 will rotate in the direction opposite that indicated by the arrow 5. The linear movement of the cutter in the direction of the arrow 7 will cause the rotary motion of the cutter 1 to be decelerated a small amount depending upon the speed of its movement in the direction of the arrow 7. On the other hand, if the work is moving laterally in the direction of the arrow 8, the rotary movement of the cutter 1 will be decelerated slightly, causing the work 6 to partially thread its way across the face of the cutter. From this it is apparent that when the worm is provided with a right hand thread, the directions of rotation of the cutter and blank being as indicated by the arrows 5 and 6, and the linear movement of the imaginary rack being as indicated by the arrow 10, the rotation of the cutter in the direction of the arrow 5 will be accelerated slightly due to the linear movement of the cutter in the direction of the arrow 7 in its passage across the face of the blank 4. The cutter will also be accelerated, if instead of the cutter moving in the direction of the arrow 7, the work moves in the direction of the arrow 8 when cutting a right hand thread, and the rotation of the cutter will be decelerated a small amount when cutting a left hand thread, the direction of movement of the work being as indicated by the arrow 6; the direction of the movement of the rack 9 being opposite to that indicated by the arrow 10; the rotary movement of the cutter being opposite to that indicated by the arrow 5; and, the linear movement of the cutter remaining the same as that indicated by the arrow 7.

Figures 7, 8:
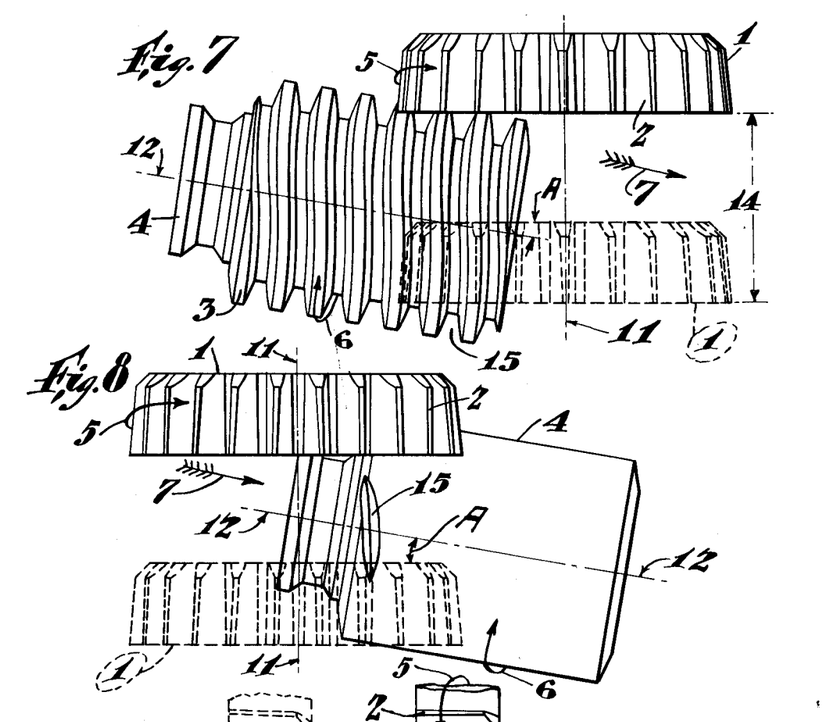
Fig. 7 is a plan view of Fig. 2.
Fig. 8 is a plan view of Fig. 1.

In Fig. 7 the angular adjustment of the cutter with respect to the work is indicated by the letter A, which, as heretofore described, equals the helix angle of the thread in the work. The position of the cutter wheel 1 is shown in full lines before it begins its cutting stroke and is shown in dotted lines after it has completed its cutting stroke, the measure 14 of the length of the cutting stroke is dependent upon the diameter of the blank and should be such as to insure the complete passage of the cutter across the face of the blank.

In Fig. 7 the threads 3 are shown as having been completely cut by the cutter 1 which is therefore at the right hand side of the person viewing the drawing.

In Fig. 8 the cutter 1 has begun to operate on the blank 4 and is therefore at the left side of the person viewing the drawing, the numeral 15 indicating the beginning of the space between the threads being cut by the cutter. The cutter in this view is also shown in the positions which it occupies at the opposite ends of its stroke. The cutter is shown in full lines in the position which it occupies at the beginning of its cutting stroke and in dotted lines in the position which it occupies at the completion of its cutting stroke.

Those skilled in this art will understand that during the return stroke of the cutter, from the position shown in dotted lines to the position shown in full lines, the cutter may be withdrawn from contact with the work to prevent dragging it through the space previously cut and thus avoid all danger of injury to the cutting edge.

Figure 9:
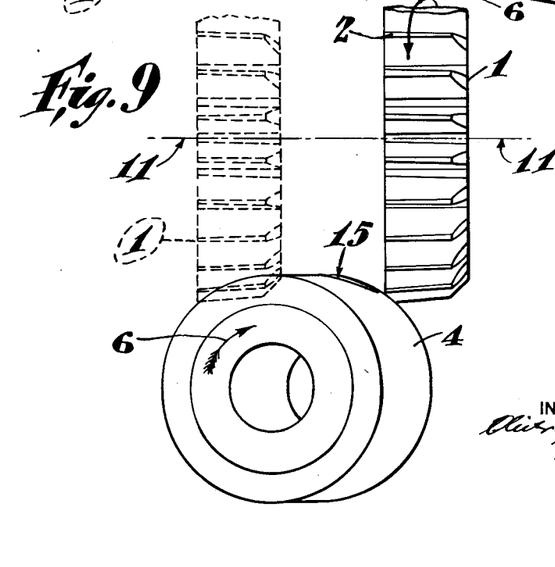
Fig. 9 is an end elevation of Fig. 1, viewed from the left hand side of the sheet of drawing.

In Fig. 9 the cutter and blank are shown in their relative positions angularly with respect to each other. The view illustrates the cutter in full lines at the beginning of its stroke and in dotted lines at the end of its stroke, beginning to cut the space 15 between the threads 3 of the work.

Figures 10, 11:
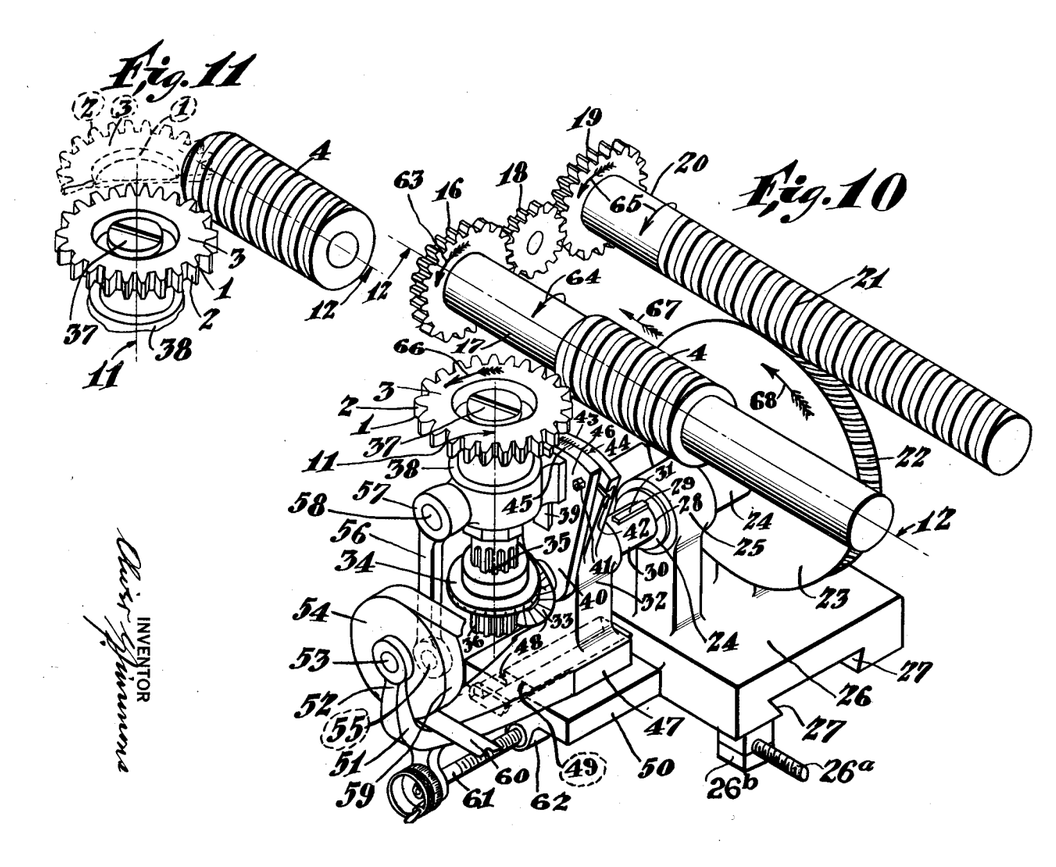
Fig. 10 is an isometric projection of one form of apparatus for practicing the method of this invention.
Fig. 11 is an isometric view of the cutter and work shown in Fig. 10.

A simple form of apparatus is illustrated in Fig. 10 for practicing the method of this invention, in which the numeral 16 indicates a drive gear mounted on the work spindle 17 to which is adapted to be secured the work blank 4. The spindle 17 is adapted to be secured in a proper housing in which is also journalled an intermediate pinion 18, adapted to mesh with the gear 16 and a gear 19, which gear 19 is adapted to be secured to the worm shaft 20, the threads 21 of which worm shaft are adapted to engage teeth 22 of a worm wheel 23. The worm wheel 23 is fixedly secured to a transverse drive shaft 24 at one end thereof, said shaft being journalled in a bearing portion 25 of a longitudinal slide 26 which slide is adapted by means of a guide way 27 to be slid on the bed of the machine, not shown, by any suitable mechanism; as for example, a lead screw 26ª and a nut 26ᵇ such as commonly used for this purpose. The other end of the shaft 24 is provided with a hole 28 and a keyway 29, which hole is adapted to receive a shaft 30 which is provided with a key 31 adapted to fit the keyway 29 in the hole 28.

The shaft 30 is journalled in a transverse slide 32 and to the outer portion of the shaft 30 is fixedly secured a miter gear 33, which is adapted to engage and intermesh with the teeth of a miter gear 34. The miter gear 34 is provided with a spline hole 35 in which a spline shaft 36 is adapted to engage, so that as the miter gear 33 rotates the miter gear 34, the spline shaft 36 is rotated thereby.

The cutter wheel is attached to the upper end of the spline shaft 36 is mounted by any suitable means; as for example, the screw bolt 37 which engages a threaded hole in the end of the shaft 36.

The shaft 36 is journalled in a cutter reciprocating slide 38 which is adapted to reciprocate on suitable guide ways 39 integral with an adjustable slide supporting member 40, which is carried by and adjustably secured by any suitable means; as for example, a screw bolt 41 engaging a T slot 42, in a projection 43 of the transverse slide 32.

The outer surface 44 of the projection 43 is graduated as shown in degrees to cooperate with a vernier 45 on an upper projection 46 of the adjustable slide supporting member 40, thus adapting the cutter carrying slide 40 to be angularly positioned, with respect to the axis of the work 4, so that the cutting face 13 of the teeth 2 of the cutter 1 may be adjusted substantially normal to the thread helix in the work, and fixedly secured in that position by means of the bolt 41, resulting thereby in adjustably positioning the axis 11 of the cutter spindle 36 with respect to the axis 12 of the work.

The lower portion 47 of the transverse slide 32 is provided with a guide way 48 adapted to engage a guide 49 which is preferably an integral part of the longitudinal slide 26, the guide 49 being an upper portion of a projection 50 of the longitudinal slide 26. The transverse slide 32 is further provided with an extending bracket 51 which has a portion 52 adapted to have fixedly secured therein a shaft 53, on which shaft is journalled a crank disc 54, to which, one end 55, of a connecting rod 56, is adapted to be journalled substantially as shown. The other end 57 of the connecting rod 56 is adapted to be journalled on a stub shaft 58 which is fixedly secured to the cutter reciprocating slide 38.

Any suitable source of power may be used to rotate the crank disc 54; as for example, the crank disc may be provided with a peripheral surface 59 adapted to engage a drive belt 60, the other end of which belt 60 may be suitably adapted to engage the surface of a pulley on a motor or line shaft or other source of power. The crank disc 54 will be caused to rotate, which will cause the connecting rod 56 to reciprocate the cutter spindle slide 38 on its guideway 39. The length of the stroke may be controlled in the usual manner by adjusting the end 55 of the connecting rod 56 nearer to or farther away from the axis of the disc shaft 53, through the medium of a T slot bolt and nut, not shown.

By positioning the carrying slide 40 and firmly securing it in any angular position of adjustment, by means of the bolt 41, with respect to the axis 12 of the work 4, the cutting face 13 of the cutter 1 may be positioned substantially normal to the thread helix in the work blank 4. This angular adjustment of the cutter carrying spindle 36 is easily accomplished in the apparatus disclosed when it is further explained that the axis of the crank disc shaft 53 is coaxial with the transverse drive shaft 24.

The cutter 1 in the apparatus disclosed may also be adjustably positioned radially with respect to the work 4, since the cutter spindle 36 and operating mechanism thereto connected is carried by the transverse slide 32 which is adapted to be moved in or out and securely fixed in any given position of adjustment to suit the diameter of the work and depth of cut desired in same by any suitable means; as for example, a cross slide screw 61 and engaging nut 62 which are well known in the art. To permit this movement of the slide 32, the shaft 30 telescopically engages in the bore 28 of the shaft 24 and is provided with the key 31 adapted to engage the keyway 29. The bore 28 in the shaft 24 being of such depth as to permit substantial movement of the transverse slide 32. Thus the shaft 30 is splined in the shaft 24 in such a way as to permit these parts to freely slide axially with respect to each other.

With further reference to Fig. 10, in the simple form of apparatus shown, it is assumed for the purpose of this description that the pitch diameter of the worm wheel 23 is the same as the pitch diameter in the cutter 1 and that the worm shaft 20, the threads 21 of which engage the teeth 22 of the worm wheel 23, has the same number of teeth or threads as it is desired to cut in the blank 4.

It is also assumed for the purpose of this description that the gear 16 on the work spindle 17 is provided with the same number of teeth as the gear 19 on the worm shaft 20. The intermediate gear 18, therefore, may be of any suitable size, the teeth of which will intermesh with the teeth of the gears 16 and 19, so that as gear 16 is rotated at the same speed, gear 19 will be rotated, the gear 19 making one turn for every turn of the gear 16. If the gear 16 is rotated in the direction of the arrow 63 the shaft 17 will rotate in the direction of the arrow 64 and the gear 19 and worm shaft 20 will be rotated in the same direction as indicated by the arrow 65.

Instead of one intermediate gear 18, two intermediate gears may be used without changing the ratio of the gears 16 and 19, but the direction of rotation of the worm shaft 20 will be changed accordingly and will rotate in the opposite direction to the work spindle 17.

Let it be assumed that the single idler gear 18 is provided as shown and that the worm shaft 20 is rotated in the direction of the arrow 65 in order to have the cutter rotate in the direction of the arrow 66 to produce a right hand thread in the work 4 and to cause the cutter speed to be decelerated but to continue to rotate in the direction of the arrow 66 in moving in the direction of the arrow 67 across the face of the work 4. Thus to generate a right hand thread in the work 4, it will be necessary to rotate the worm wheel 23 in the direction of the arrow 68, hence a right hand thread 21 will be necessary in the worm shaft 20.

If two idler gears 18 were used, instead of one, as shown, the worm shaft 20 could be provided with a left hand thread and a right hand thread would be produced in the blank 4. If, however, a left hand thread is desired in the blank 4, a right hand thread 21 may be provided in the worm shaft 20 and another idler introduced to mesh with idler 18 and gear 19, or it could be introduced to mesh with idler 18 and gear 16. This would change the direction of rotation of the cutter 1 to a direction opposite to that indicated by the arrow 66, the direction of rotation of the work spindle 17 remaining the same as indicated by the arrow 64.

During the operation of the machine, the worm wheel will have a rotary movement imparted thereto by the rotating worm 21, and will have an additional movement of rotation due to its rolling movement along the worm 21, the speed of rotation of the worm wheel 23 at any instant being the resultant or algebraic sum of the two movements of rotation above mentioned. Assuming the worm wheel 23 to be held with its axis in a fixed position with respect to the shaft 20, a fixed speed of rotation will be imparted to the worm wheel 23 which is dependent upon the tooth ratio between the worm and worm wheel. When longitudinal movement is imparted to the carriage supporting the worm wheel 23, an additional movement of rotation is imparted to the worm wheel 23 which is the rolling movement which the pitch cylinder of the worm wheel would have in rolling without slippage on a plane tangent to the pitch cylinder of the worm 21.

The imaginary rack common to the worm 21 and worm wheel 23 has a uniform linear movement at a speed dependent upon the speed of rotation of the worm, and the worm wheel 23, during its rolling movement on the worm 21, is maintained in intermeshing engagement with the moving imaginary rack. The rotary movement of the worm wheel 23 is therefore exactly that which it would have if in mesh with a rack moving longitudinally at uniform speed while the worm wheel 23 is being rolled along the rack.

The spindle 17 carrying the blank 4 is directly geared to the worm shaft 20 and the cutter 3 is geared to the worm wheel driven by the worm 21, so that the speed of rotation of the blank 4 is directly proportional to the speed of rotation of the worm 21 and the speed of rotation of the cutter 3 is directly proportional to the speed of rotation of the worm wheel 23. Since the worm 21 and worm wheel 23 are at all times in intermeshing engagement with a common imaginary rack, it will be readily apparent that by providing the proper gear ratios between the shaft 20 and spindle 17 and between the worm wheel 23 and cutter 3, the speed of rotation of the cutter 3 may be differentially correlated with respect to the speed of rotation of the blank in such a manner that the cutter 3 will be maintained in rolling intermeshing engagement with the imaginary rack of the worm to be generated.

The reciprocation of the cutter is in a direction parallel with the teeth of the imaginary rack so that throughout the stroke of the cutter, the teeth thereof remain in mesh with the imaginary rack moving at a uniform linear speed, so that throughout each cutting stroke the teeth of the cutter remain in the spaces between the teeth of the worm being generated. The cutter 3 would generate its rack in a blank moving tangentially of the cutter at a speed equal to that of the imaginary rack of the worm 4 and its generating action on the blank is equivalent to the generating action of a moving generating rack, producing helicoid teeth of uniform pitch in the blank.

The apparatus is illustrated in its very simplest form to obtain the required movements between the cutter wheel 1 and the work blank 4, and at the same time provides for the differential correlation of the movements referred to.

A commercial machine of different construction from that shown in the apparatus of the present invention, but which is capable of being operated upon the method herein described, forms the subject matter of my copending application, Serial No. 443,185, gear shaper, filed April 10, 1930.

The illustration in Fig. 10 shows the working parts as they would appear after the cutter 1 completed the cutting of the threads of the blank 4.

The differential correlation of the movements heretofore referred to are automatically taken care of in this simple form of apparatus. It is, however, obvious to those skilled in the art that the differential correlation of the movements may be obtained by means of two or more trains of gears and when said trains of gears are used it is not necessary that the pitch diameter of the worm wheel 23 be equal to the pitch diameter of the cutter 1. It may be very much larger which obviously would be desired in a machine embodying the elements of the simple apparatus disclosed, and, similarly, the worm shaft 20 need not be provided with the same number of threads as that number desired in the work, since to those skilled in the art it is understood that the ratio between the worm shaft 20 and the work spindle 17 may be in the ratio desired to give the proper rotational movement to the cutter 1.

More particularly, the embodiment of the invention herein illustrated is an improvement on the method and apparatus disclosed in my Patent No. 1,426,680, dated August 22, 1922, to which reference is hereby directed for explanation of the method not described in the present specification.

Let it suffice to say, therefore, that as the work spindle 17 is rotated, so also is the worm shaft 20 rotated, which in turn rotates shaft 24, and through the intermediary of the miter gears 33 and 34, the cutter 1 is rotated in the proper ratio, and as heretofore described, the cutter 1 is reciprocated axially of its spindle 36, see Fig. 11.

In Fig. 11 the full line drawing of the cutter 1 represents substantially the position of the cutter on its lowermost position of stroke, whereas, the dotted lines of the cutter 1 represent the same in substantially its uppermost position of stroke. This reciprocation of the cutter has been previously described so that if it is assumed that the cutter 1 has completed the cutting of the teeth in the blank 4, it will be necessary to move the cutter to the opposite end of the blank, which may be easily accomplished in this apparatus by moving the cutter away from the work spindle 17, by means of the cross slide screw 61 previously described, and then moving the longitudinal slide 26 in the direction of the axis of the work, and to the other end of the work, to a position which will permit the cutter 1 to clear the work when the cutter is moved in to the proper depth of thread desired in the blank preparatory to starting a cut. The apparatus may then be started to rotate as previously described and the belt 60 caused to rotate the crank disc 54 which will cause the cutter 1 to reciprocate as heretofore referred to. This reciprocating movement of the cutter is relatively fast compared to the slower movement of the work 4. Simultaneously, with this slow movement of the work, the slide 26 is caused to move slowly in the direction of the arrow 67 longitudinally of the axis 12 of the work, and these movements are continued until the cutter reaches the position shown in the drawings, Fig. 10, completing the cutting of the worm.

Obviously, the circular pitch of the cutter, measured in a plane of revolution of the cutter, will correspond to the normal circular pitch in the work, hence a given cutter may be used to cut a worm having a single or multinumber of threads, so long as the normal circular pitch of the work corresponds to the circular pitch in a plane of revolution of the cutter. Thus one cutter may be used for the same normal pitch worm, regardless of its number of threads, which is greatly to be desired commercially because of the much smaller investment in cutters and also because of the better generating cutting action of a reciprocating cutter, the plane of the cutting face of the teeth of which are always normal to the thread helix desired in the work.

Having thus described my invention, I claim:

1. The herein described method of generating the threads of worms which consists in cutting the periphery of a blank with a gear shaped cutter having its axis transversely disposed with respect to the axis of the blank, imparting correlated rotational movements to the blank and cutter, rolling the cutter longitudinally of the blank, and simultaneously reciprocating the cutter transversely across the peripheral face of the blank to cut the periphery of the blank.

2. The herein described method of generating the threads of worms which consists in cutting the periphery of a blank with a gear shaped cutter having its axis transversely disposed with respect to the axis of the blank, imparting correlated rotational movements to the blank and cutter, rolling the cutter longitudinally of the blank, and simultaneously imparting a relatively rapid reciprocating movement to the cutter with respect to the blank in a direction transversely across the peripheral face of the blank to cut the periphery of the blank.

3. The herein described method of generating the threads of worms which consists in cutting the periphery of a blank with a gear shaped cutter having its axis transversely disposed with respect to the axis of the blank, imparting correlated rotational movements to the blank and cutter, rolling the cutter longitudinally of the blank, simultaneously imparting a relatively rapid reciprocating movement to the cutter with respect to the blank in a direction transversely across the peripheral face of the blank to cut the periphery of the blank, and feeding the cutter toward the axis of the blank to gradually increase the depth of cut.

4. The herein described method of generating the threads of worms which consists in cutting the periphery of a blank with a gear shaped cutter having longitudinally straight teeth with cutting edges at the intersections of the tooth faces with an end face of the cutter and having its axis disposed at an inclination to planes normal to the axis of the blank corresponding to the helix angle of the worm to be generated, imparting correlated rotational movements to the blank and cutter rolling the cutter longitudinally of the blank, and simultaneously reciprocating the cutter axially to cut across the periphery of the blank.

5. The herein described method of generating the threads of worms which consists in cutting the periphery of a blank with a gear shaped cutter having longitudinally straight teeth with cutting edges at the intersections of the tooth faces with an end face of the cutter and having its axis disposed at an inclination to planes normal to the axis of the blank corresponding to the helix angle of the worm to be generated, imparting correlated rotational movements to the blank and cutter rolling the cutter longitudinally of the blank, simultaneously reciprocating the cutter axially to cut across the periphery of the blank, and feeding the cutter toward the axis of the blank to gradually increase the depth of cut.

6. The herein described method of generating the threads of worms which consists in cutting the periphery of a rotating blank with a rotating cutter provided with radially projecting teeth and rotating about an axis disposed transversely with respect to the axis of the blank, imparting a relative linear movement to the cutter and blank longitudinally of the blank, so correlating the speeds of rotation of the cutter and blank as to maintain the cutter in mesh with an imaginary moving rack common to the cutter and the worm to be generated, and reciprocating the cutter in the direction of the rack teeth across the peripheral face of the blank.

7. The herein described method of generating the threads of worms which consists in cutting the periphery of a rotating blank with a rotating cutter provided with radially projecting teeth and rotating about an axis disposed transversely with respect to the axis of the blank, imparting a relative linear movement to the cutter and blank longitudinally of the blank, so correlating the speeds of rotation of the cutter and blank as to maintain the cutter in mesh with an imaginary moving rack common to the cutter and the worm to be generated, reciprocating the cutter in the direction of the rack teeth across the peripheral face of the blank, and feeding said cutter toward the axis of the blank to gradually increase the depth of the cut.

8. The herein described method of generating the threads of worms which consists in cutting the periphery of a rotating blank with a rotating gear shaped cutter having cutting edges at the intersection of a face of the cutter with the side faces of the teeth thereof and rotating about an axis disposed transversely with respect to the axis of the blank, imparting a relative linear movement to the cutter and blank longitudinally of the blank, so correlating the speed of rotation of the cutter with respect to the speed of rotation of the blank and the rate of linear movement as to maintain the rotation of the cutter at the speed at which the cutter would be driven by the worm to be generated rotating at the speed of rotation of the blank while rolling on the worm longitudinally thereof with a linear speed equal to the speed of its linear movement along the blank, and reciprocating the cutter transversely across the peripheral face of the blank.

9. The herein described method of generating the threads of worms which consists in cutting the periphery of a rotating blank with a rotating gear shaped cutter having cutting edges at the intersection of a face of the cutter with the side faces of the teeth thereof and rotating about an axis disposed transversely with respect to the axis of the blank, imparting a relative linear movement to the cutter and blank longitudinally of the blank, so correlating the speed of rotation of the cutter with respect to the speed of rotation of the blank and the rate of linear movement as to maintain the rotation of the cutter at the speed at which the cutter would be driven by the worm to be generated rotating at the speed of rotation of the blank while rolling on the worm longitudinally thereof with a linear speed equal to the speed of its linear movement along the blank, reciprocating the cutter transversely across the peripheral face of the blank, and feeding the cutter toward the axis of the blank to gradually increase the depth of the cut.

10. The herein described method of generating the threads of worms which consists in cutting the periphery of a rotating blank with a rotating cutter provided with radially projecting teeth and rotating about an axis disposed transversely with respect to the axis of the blank, imparting a relative linear movement to the cutter and blank longitudinally of the blank, reciprocating the cutter transversely across the peripheral face of the blank, and so correlating the speeds of rotation of the cutter and blank as to maintain teeth of the cutter in mesh with an imaginary moving rack common to the cutter and worm to be generated.

11. The herein described method of generating the threads of worms which consists in cutting the periphery of a rotating blank with a rotating cutter provided with radially projecting teeth and rotating about an axis disposed transversely with respect to the axis of the blank, imparting a relative linear movement to the cutter and blank longitudinally of the blank, reciprocating the cutter transversely across the peripheral face of the blank, so correlating the speeds of rotation of the cutter and blank as to maintain teeth of the cutter in mesh with an imaginary moving rack common to the cutter and worm to be generated, and feeding the cutter toward the axis of the blank to gradually increase the depth of the cut.

12. The herein described method of generating worm threads having involute helicoid faces which consists in cutting the periphery of a rotating blank with a rotating gear shaped cutter provided with teeth having involute faces and cutting edges at the intersection of said involute faces with an end face of the cutter, the cutter being disposed with its axis at an inclination to the axis of the blank, imparting a relative linear movement to the cutter and blank longitudinally of the blank, reciprocating the cutter transversely across the peripheral face of the blank, and so correlating the speeds of rotation of the cutter and blank as to maintain the cutter and worm to be generated in the relative positions which they would occupy while being simultaneously driven by an imaginary moving rack common to the worm and cutter.

13. The herein described method of generating worm threads having involute helicoid faces which consists in cutting the periphery of a rotating blank with a rotating gear-shaped cutter provided with teeth having involute faces and cutting edges at the intersection of said involute faces with an end face of the cutter, the cutter being disposed with its axis at an inclination to the axis of the blank, imparting a relative linear movement to the cutter and blank longitudinally of the blank, reciprocating the cutter transversely across the peripheral face of the blank, so correlating the speeds of rotation of the cutter and blank as to maintain the cutter and work to be generated in the relative positions which they would occupy while being simultaneously driven by an imaginary moving rack common to the worm and cutter and feeding the cutter toward the axis of the blank to gradually increase the depth of cut.

14. The herein described method of generating the threads of worms which consists in cutting the periphery of a rotating blank with a gear shaped cutter having longitudinally straight teeth with cutting edges at the intersections of the tooth faces with an end face of the cutter and rotating about an axis disposed at an angle to planes normal to the axis of the blank corresponding to the helix angle of the worm to be generated, imparting a relative linear movement to the cutter and blank longitudinally of the blank, simultaneously imparting a relatively rapid axial reciprocating movement to the cutter to cut across the peripheral face of the blank, and maintaining the rotation of the cutter at a speed so correlated to the speed of rotation of the blank and the speed of linear movement as to correspond to the speed at which the cutter would be driven by the finished worm rotating at the speed of rotation of the blank while rolling along the worm with a linear speed corresponding to its linear speed longitudinally of the blank.

15. In apparatus of the character described, a work spindle, a support mounted for movement longitudinally of the work spindle, a cutter spindle mounted for endwise reciprocation in said support and disposed transversely with respect to the work spindle, means for reciprocating the cutter spindle, gearing connecting the work spindle and cutter spindle, and means for correlating the rotational movements of the spindles with respect to the linear movements of said support.

16. In an apparatus of the character described, a work spindle, a support mounted for movement longitudinally of the work spindle, a cutter spindle mounted for endwise reciprocation in said support and disposed transversely with respect to the work spindle, gearing connecting the work spindle and cutter spindle, means independent of said gearing for imparting a relatively rapid reciprocating movement to said cutter spindle, and means for correlating the rotational movements of the spindles with respect to the linear movements of said support.

17. In an apparatus of the character described, a work spindle, a gear shaped cutter disposed with its axis transverse to the work spindle in position to engage a blank carried by the work spindle, a support for the cutter movable longitudinally of the work spindle, gearing connecting the work spindle and cutter, means for reciprocating said cutter axially, and means for correlating the rotational movements of the spindles with respect to the linear movements of said support.

18. In an apparatus of the character described, a work spindle, a worm parallel with the work spindle, gearing connecting the work spindle and worm, a carriage movable longitudinally of the work spindle, a worm wheel journaled on said carriage and meshing with said worm, a cutter spindle on said carriage radially disposed with respect to the axis of said worm and having means for supporting a cutter in position to engage a blank carried by the work spindle, gearing connecting the worm wheel and cutter spindle, and means for imparting an endwise reciprocating movement to said cutter spindle.

19. In an apparatus of the character described, a work spindle, a worm parallel with the work spindle, gearing connecting the work spindle and worm, a carriage movable longitudinally of the work spindle, a worm wheel journalled on said carriage and meshing with said worm, a supporting member on said carriage mounted for angular adjustment about the axis of the worm wheel, a cutter spindle mounted on said supporting member for rotational and endwise reciprocating movements thereon, gearing connecting the cutter spindle and worm wheel, a gear shaped cutter fixed to the cutter spindle in position to engage with a blank on the work spindle, and means on said carriage for imparting reciprocating movements to said cutter spindle.

20. In an apparatus of the character described, a work spindle, a worm parallel with the work spindle, gearing connecting the work spindle and worm, a carriage movable longitudinally of the work spindle, a worm wheel journalled on said carriage and meshing with said worm, a supporting member on said carriage mounted for angular adjustment about the axis of the worm wheel, a slide mounted on said supporting member for movement radially of the axis of the worm wheel, a cutter spindle journalled in said slide, gearing for driving the cutter spindle from the worm gear, a gear shaped cutter fixed to the cutter spindle in position to engage a blank on the work spindle, and means for imparting a reciprocating movement to said slide.

21. In an apparatus of the character described, a work spindle, a worm parallel with the work spindle, gearing connecting the work spindle and worm, a carriage movable longitudinally of the work spindle, a worm wheel journalled on said carriage and meshing with said worm, a supporting member on said carriage mounted for angular adjustment about the axis of the worm wheel, means for adjusting said supporting member on the carriage axially of said worm wheel, a slide mounted on said supporting member for movement radially of the axis of the worm wheel, a cutter spindle journalled in said slide, gearing for driving the cutter spindle from the worm gear, a gear shaped cutter fixed to the cutter spindle in position to engage a blank on the work spindle, and means for imparting a reciprocating movement to said slide.

22. In an apparatus of the character described, a work spindle, a worm parallel with the work spindle, gearing connecting the work spindle and worm, a carriage movable longitudinally of the work spindle, a worm wheel journalled on said carriage and meshing with said worm, a supporting member on said carriage mounted for angular adjustment about the axis of the worm wheel, a slide mounted on said supporting member for movement radially of the axis of the worm wheel, a cutter spindle journalled in said slide, gearing for driving the cutter spindle from the worm gear, and means for reciprocating the slide comprising an eccentric member rotatably mounted on the carriage coaxially with the worm wheel and a connecting rod connecting said eccentric member and said slide.

23. In an apparatus of the character described, a work spindle, a worm parallel with the work spindle, gearing connecting the work spindle and worm, a carriage movable longitudinally of the work spindle, a worm wheel journalled on said carriage and meshing with said worm, a supporting member on said carriage mounted for angular adjustment about the axis of the worm wheel, means for adjusting said supporting member on the carriage axially of said worm wheel, a slide mounted on the supporting member for movement radially of the axis of the worm wheel, a shaft splined to the worm wheel and movable with said supporting member, a miter gear fixed to said shaft, a miter gear journalled in said supporting member and meshing with the first mentioned miter gear, a cutter spindle journalled in said slide and movable therewith, said cutter shaft being splined to the miter gear on said supporting member, a gear shaped cutter fixed to the cutter spindle in position to engage a blank on the work spindle, and means for reciprocating said slide.

24. In an apparatus of the character described, a work spindle, a worm parallel with the work spindle, gearing connecting the work spindle and worm, a carriage movable longitudinally of the work spindle, a worm wheel journalled on said carriage and meshing with said worm, a supporting member on said carriage mounted for angular adjustment about the axis of the worm wheel, means for adjusting said supporting member on the carriage axially of said worm wheel, a slide mounted on the supporting member for movement radially of the axis of the worm wheel, a shaft splined in the worm wheel and movable with said supporting member, a miter gear fixed to said shaft, a miter gear journalled in said supporting member and meshing with the first mentioned miter gear, a cutter spindle journalled in said slide and movable therewith, said cutter shaft being splined in the miter gear on said supporting member, a gear shaped cutter fixed to the cutter spindle in position to engage a blank on the work spindle, a member rotatably mounted on said carriage and having an eccentric crank pin, a connecting rod pivoted to said crank pin and to said slide, and means for driving said rotatable member.

25. Apparatus of the character described comprising a work spindle for supporting a worm blank, a cutter spindle disposed transversely of the work spindle, a gear shaped cutter fixed to the cutter spindle in a position to engage the worm blank on the work spindle, means for reciprocating the cutter spindle axially and for simultaneously moving the same longitudinally of the work spindle, and means for imparting correlated rotational movements to the work and cutter spindles to maintain the cutter in rolling mesh with an imaginary moving rack common to the cutter and the worm to be generated.

26. Apparatus of the character described comprising a work spindle for supporting a worm blank, a cutter spindle disposed transversely of the work spindle, a gear shaped cutter fixed to the cutter spindle in a position to engage the worm blank on the work spindle, means for moving the cutter spindle longitudinally of the work spindle, means for imparting correlated rotational movements to the work and cutter spindles to maintain the cutter in rolling mesh with an imaginary moving rack common to the cutter and worm to be generated, and means for imparting a relatively rapid axial reciprocating movement to the cutter spindle to cause the cutter to cut across the peripheral face of the blank.

27. Apparatus of the character described comprising a work spindle for supporting a worm blank, a cutter spindle disposed transversely of the work spindle, a gear shaped cutter fixed to the cutter spindle in a position to engage the worm blank on the work spindle, means for moving the cutter spindle longitudinally of the work spindle, means for imparting correlated rotational movements to the work and cutter spindles to maintain the cutter in rolling mesh with an imaginary moving rack common to the cutter and worm to be generated, means for imparting a relatively rapid axial reciprocating movement to the cutter spindle to cause the cutter to cut across the peripheral face of the blank, and means for feeding the cutter spindle toward the axis of the blank to gradually increase the depth of cut.

28. The herein described method of generating the threads of worms which consists in positioning a gear shaper cutter and worm blank with their axes in crossing relation, causing relative movements of rotation and translation between the cutter and blank such that the cutter travels longitudinally with respect to the blank and reciprocates across the face of the blank, and so correlating said relative movements that the cutter and worm being generated remain in mesh with an imaginary moving rack common to the cutter and the worm.

In testimony whereof I affix my signature.

OLIVER G. SIMMONS.